United States Patent [19]
Tooze

[11] Patent Number: 5,109,470
[45] Date of Patent: Apr. 28, 1992

[54] DATA TRANSMISSION LINE AND STORAGE BODY

[75] Inventor: Michael J. Tooze, Rochester, England

[73] Assignee: GEC-Marconi Limited, England

[21] Appl. No.: 634,123

[22] PCT Filed: May 2, 1990

[86] PCT No.: PCT/GB90/00677
§ 371 Date: Dec. 31, 1990
§ 102(e) Date: Dec. 31, 1990

[87] PCT Pub. No.: WO90/13786
PCT Pub. Date: Nov. 15, 1990

[30] Foreign Application Priority Data

May 3, 1989 [GB] United Kingdom ............ 8910104

[51] Int. Cl.⁵ .................................. G02B 6/00
[52] U.S. Cl. .................................. 385/147; 244/3.1; 244/3.12
[58] Field of Search ............ 350/96.1, 96.23; 244/3.1, 3.12

[56] References Cited

U.S. PATENT DOCUMENTS

| | | | |
|---|---|---|---|
| 3,319,781 | 5/1967 | Simpson et al. | 244/3.12 X |
| 3,868,883 | 3/1975 | Tucker | 244/3.12 X |
| 4,860,968 | 8/1989 | Pinson | 244/3.13 |

FOREIGN PATENT DOCUMENTS 0337880 4/1988 France.

Primary Examiner—John D. Lee
Assistant Examiner—Stephen W. Barns
Attorney, Agent, or Firm—Kirschstein, Ottinger, Israel & Schiffmiller

[57] ABSTRACT

A spooled optical fibre data transmission line arrangement, for providing communication between a missile and a missile launcher, comprising a rigid, fluid-tight, hollow body having first and second separable parts, the optical fibre being carried by one part and connected at one end via an opto-electric transducer to a terminal extending through the wall of that one part, and the other end of the fiber being connected via a second opto-electric transducer to a terminal extending through the wall of the other part. The two separable parts suitably meet at a tear line and tags extend from adjacent the tear line on one part to the other part ot assist in complete rupture along the tear line when the fibre is required to be extended.

5 Claims, 1 Drawing Sheet

DATA TRANSMISSION LINE AND STORAGE BODY

BACKGROUND OF THE INVENTION

1. Field of the Invention

This invention relates to data transmission lines and is particularly though by no means exclusively concerned with data transmission lines to extend between a missile and a missile launcher for the communication of data therebetween.

2. Description of Related Art

There is a need to provide a spooled optical fibre data transmission line which may be stored for considerable periods of time, perhaps years, and which, when deployed, must serve its intended purpose that it functions efficiently as a data transmission element. Notwithstanding existing methods of protection for such fibre optic lines they remain vulnerable to damage by penetration of water vapour and possibly the freezing of such water at defects, minor fissures in the optical fibre cladding. Such damage may render the optical fibre ineffective.

SUMMARY OF THE INVENTION

According to the invention a data transmission line comprises: a fluid tight substantially rigid hollow body having first and second separable parts, within said body a continuous very substantial length of optical fibre carried by one separable part and being capable of supporting optical data transmission therealong; first penetration terminal means in a wall of one of the separable parts; second penetration terminal means in a wall of the other separable part; first electro-optic signal transducer means carried by said one of the separable parts and connected between the said first terminal means and one end of the optical fibre; and second electro-optic signal transducer means carried by the other separable part and connected between the other end of the optical fibre and said second terminal means.

Preferably, the first and second separable parts meet at a tear line; and secured to one separable part adjacent the tear line there is tag means which, when pulled, creates a complete rupture between the two parts along the tear line.

Conveniently, the hollow body is in the form of a generally cylindrical metal can; and the tear line is defined in an end surface thereof.

Desirably, the said tear line defines along part of its length the boundary of a tear strip zone; and the tag means is secured to the said tear strip zone.

Desirably, also, the said tag means is integral with a puller means carrying further terminal means connected to the said second penetration terminal means by an electrical conductor of a length such that when under force applied to the puller means the said electrical conductor remains in an unstressed state throughout the lifting of the tear strip zone in the course of the complete rupture between the two separable parts along the tear line.

The invention also extends to the combination comprising: a missile; a missile launcher; and, between the missile and the missile launcher, a data transmission line as hereinbefore specified, said separable parts being respectively attached to said missile and said missile launcher.

DESCRIPTION OF THE DRAWINGS

One data transmission line in accordance with the invention will now be described, by way of example, with reference to the accompanying drawing, in which.

DETAILED DESCRIPTION OF THE PREFERRED EMBODIMENTS

Figure 1:
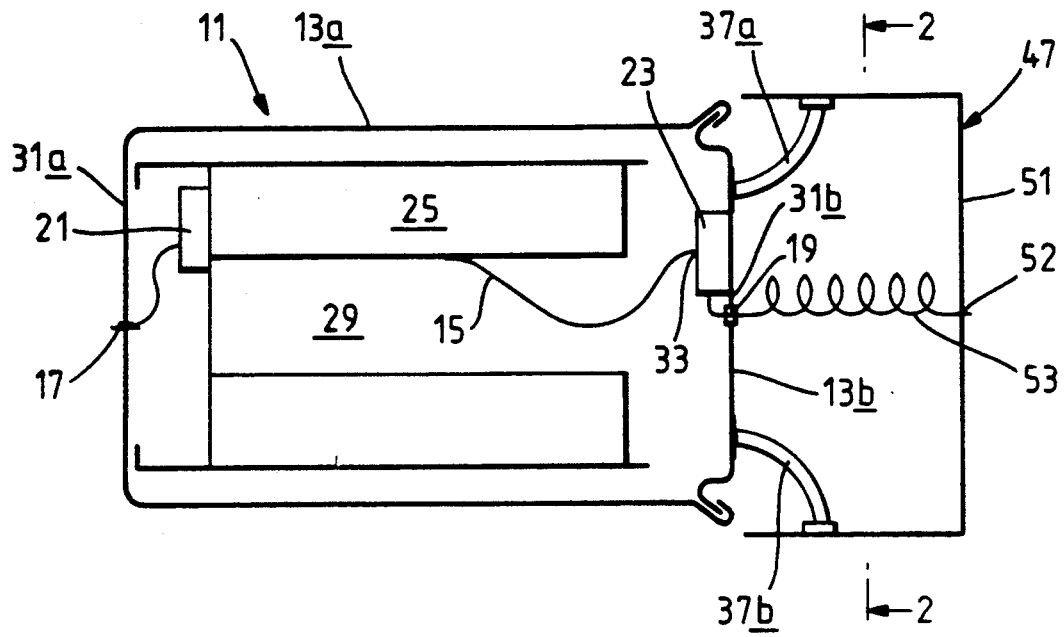
FIG. 1 shows a diagrammatic longitudinal section of the transmission line.
Figure 2:
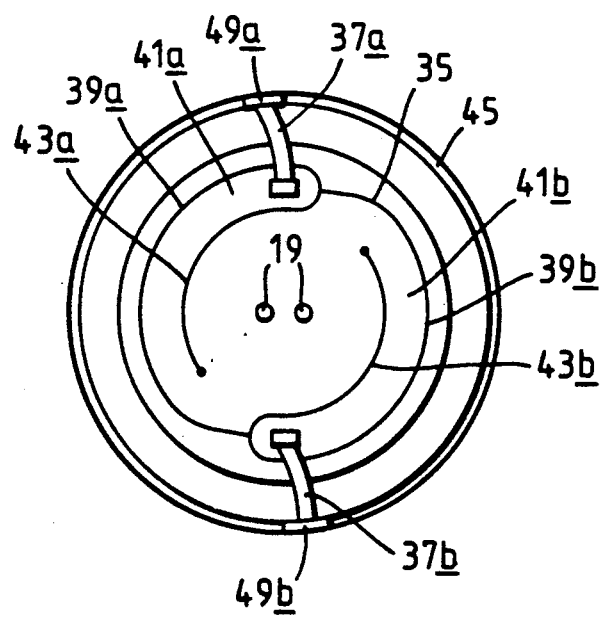
FIG. 2 shows a section on 2—2 of FIG. 1.

The data transmission line comprises a fluid tight substantially rigid hollow body 11 having first and second separable parts 13a, 13b, respectively; a continuous very substantial length of optical fibre 15; first penetration terminal means 17; second penetration terminal means 19; first electro-optic transducer means 21; and second electro-optic signal transducer means 23.

The hollow body 11 defines a substantially contaminant free space 29 being charged with dry inert gas such, for example, as nitrogen. The optical fibre 15 is carried as a spooled pack 25 by the separable part 13a. The first and second penetration terminal means 17, 19 are, respectively, in walls 31a, 31b of the separable parts 13a, 13b.

The first transducer means 21 is carried by the part 13a and is connected between the first terminal means 17 and one end 31 of the optical fibre 15; the second transducer means 23 is carried by the part 13b and is connected between the other end 33 of the optical fibre 15 and the second penetration terminal means 19.

The hollow body is constituted as a thin wall cylindrical deep drawn metal canister, one separable part 13a being the main body part of the canister and the lid part of the canister incorporating the other separable part 13b.

The main body part 13a and the separable part 13b in the lid meet at a continuous tear line 35.

Adjacent to the tear line 35 at diametrically opposed positions of the canister lid there is tag means constituted by two tags 37a, 37b.

More particularly, opposed arc portions 39a, 39b, of the tear line 35 constitute the outer boundaries of two tear strip zones 41a, 41b, respectively, having corresponding arcuate inner boundaries 43a, 43b. And the tags 37a, 37b, are respectively secured to the tear strip zones 41a, 41b, towards each end thereof.

The tags 37a, 37b, are respectively secured, at their ends remote to the can lid, to the inner surface of the side wall 45 of puller means in form of an end cap 47 at diametrically opposed positions 49a, 49b, thereof.

The end wall 51 of the end cap 47 carries third penetration terminal means 52. An electrical conductor 53 connects the terminal means 52 to the second penetration terminal means 19. The conductor 53 has a length substantially greater than the distance separating the end wall 51 from the part 13b of the canister 11.

The main body part 13a of the canister is adapted (by means not shown) to be secured to a missile (not shown); and the end cap 47 is adapted (by means not shown) to be secured to a missile carrier (not shown). At firing of the missile from the missile carrier, the end cap 47 being retained, the part 13a of the canister 11 is freed from the part 13b at the tear line 35 under the reactive force transmitted to the separable part 13b by way of the tags 37a, 37b.

The extended length of the conductor 53 in relation to the separation distance between the end wall 51 and separable part 13b, ensures that at no time is the conductor 53 subject to tensile force and, hence is not liable to breakage at missile firing.

Thereafter, the missile carried part 13a of the canister 11 has a connection with the missile carrier retained part 13b, only by way of the optical fibre 15, the latter being drawn from the spooled pack 25.

The electro-optic transducer means 21, 23, are each constituted as transmitter/receiver means; and the optical fibre 15 constitutes a bi-directional data link therebetween thereby enabling the transmission of data in either direction between the two separated parts 13a, 13b.

I claim:

1. A data transmission line comprising: a fluid-tight, substantially rigid, hollow body having first and second separable parts; within said body, a continuous very substantial length of optical fibre carried by one of the separable parts and being capable of supporting optical data transmission therealong; first penetration terminal means in a wall of said one separable part; second penetration terminal means in a wall of the other of the separable parts; first electro-optic signal transducer means carried by said one separable part and connected between said first terminal means and one end of the optical fibre; and second electro-optic signal transducer means carried by said other separable part and connected between the other end of the optical fibre and said second terminal means.

2. A data transmission line according to claim 1 wherein said first and second separable parts meet at a tear line; and secured to said one separable part adjacent the tear line, there is tag means which, when pulled, creates a completer rupture between the two parts along the tear line.

3. A data transmission line according to claim 2 wherein said hollow body is in the form of a generally cylindrical metal can; and the tear line is defined in an end thereof.

4. A data transmission line according to claim 2 wherein said tear line defines along part of its length the boundary of a tear strip zone; and the tag means is secured to said tear strip zone.

5. A data transmission line according to claim 4 wherein said tag means is integral with a puller means carrying further terminal means connected to said second penetration terminal means by an electrical conductor of a length such that when under force applied to the puller means, said electrical conductor remains in an unstressed state throughout the lifting of the tear strip zone in the course of the complete rupture between the two separable parts along the tear line.

* * * * *